(12) United States Patent
Varoglu

(10) Patent No.: US 9,019,068 B2
(45) Date of Patent: Apr. 28, 2015

(54) METHOD, APPARATUS AND SYSTEM FOR AUTOMATED CHANGE OF AN OPERATING MODE RELATING TO A WIRELESS DEVICE

(75) Inventor: Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 525 days.

(21) Appl. No.: 12/753,086

(22) Filed: Apr. 1, 2010

(65) Prior Publication Data

US 2011/0241827 A1 Oct. 6, 2011

(51) Int. Cl.
*G08B 21/00* (2006.01)
*H04B 7/185* (2006.01)

(52) U.S. Cl.
CPC ..................................... *H04B 7/185* (2013.01)

(58) Field of Classification Search
USPC ............. 340/5.1, 5.21, 5.31, 5.32, 5.61, 5.62, 340/5.74, 7.2; 455/41.2, 414.1, 414.2, 455/550.1; 370/328
See application file for complete search history.

(56) References Cited

U.S. PATENT DOCUMENTS

| | | | |
|---|---|---|---|
| 5,995,833 A | 11/1999 | Zicker | |
| 6,393,301 B1 | 5/2002 | Oda | |
| 7,181,229 B2 | 2/2007 | Singh | |
| 7,236,776 B2 | 6/2007 | Nath et al. | |
| 2005/0007967 A1* | 1/2005 | Keskar et al. | 370/310 |
| 2005/0255863 A1* | 11/2005 | Wang | 455/456.3 |
| 2009/0186633 A1* | 7/2009 | Yonker et al. | 455/456.6 |
| 2010/0099354 A1* | 4/2010 | Johnson | 455/41.1 |
| 2010/0210254 A1* | 8/2010 | Kelly et al. | 455/418 |

* cited by examiner

*Primary Examiner* — Mark Rushing
(74) *Attorney, Agent, or Firm* — Fish & Richardson P.C.

(57) ABSTRACT

A method, apparatus, and system for automatically changing the operating mode of a wireless device are provided. A determination is made whether at least one state of the wireless device has changed. This determination is performed using at least one integrated device of the wireless device. A determination is made whether the change in the state of the wireless device indicates that the first operating mode should be changed. The operating mode is changed to a second operating mode of the wireless device in response to a determination that the change in the state of the wireless device indicates that the first operating mode should be changed. Changing to the second operating mode includes altering at least one wireless communication operation of the wireless device. Examples of the second operating mode may include, but is not limited to, an airplane mode, a train mode, a vehicle mode, an environmental condition mode; or a device-access mode.

22 Claims, 11 Drawing Sheets

METHOD, APPARATUS AND SYSTEM FOR AUTOMATED CHANGE OF AN OPERATING MODE RELATING TO A WIRELESS DEVICE

BACKGROUND OF THE INVENTION

1. Field of the Invention

This invention relates generally to a wireless device and an operation thereof, and, more particularly, to a method, apparatus, and system for automatically changing an operating mode of the wireless device.

2. Description of the Related Art

The use of wireless devices continues to increase in modern society. People of various socioeconomic statuses use wireless devices in increasing numbers. Wireless devices may include various types of fixed, mobile and/or portable two-way communication devices, such as radios, cellular telephones, personal digital assistants, and/or various wireless networking devices. The presence of wireless devices sometimes can interfere with operations of machineries, transportation facilities, etc. For example, often, airlines require that passengers in an airplane disable wireless devices during operation of the airplane. Regardless of the rationale for these rules, the fact remains that airlines rely on compliance of these rules for safe operation of airplanes. Therefore, it is becoming increasingly important that wireless devices be placed in a an altered, less functional mode such that it complies with the requirements promulgated by the airlines, the Federal Aviation Administration, the Department of Transportation, and/or the like. Many systems generally lack an efficient, non-intrusive manner to allow for such an altered mode of operation.

In another context, environmental factors may affect the operation of wireless devices. For example, certain environmental conditions, such as humidity, temperature, pressure, etc., can affect normal operation of the wireless devices. One possible problem is that operation in certain environmental conditions, such as excessive temperature and/or humidity, damage to the circuitry in the device, e.g., a short circuit, may occur. Therefore, it would be desirable to reduce the possibility of malfunction of operation of, or damage to, the wireless device due to environmental factors.

Moreover, as the complexities of wireless devices increase, the amount of information processed and/or stored by the wireless devices also increase. This may cause various security concerns. Wireless devices generally carry various types of personal information, such as financial records, medical records, contact information, network access information, etc. If this information were to be accessed by an unauthorized user, the security and privacy of the user may be compromised. Some solutions to this problem attempt to provide some security for the user by requiring a password input. However, many times, these passwords can be over-ridden, compromised, or not implemented by the user. Therefore, it would be desirable to efficiently prevent unauthorized usage of the wireless device by efficiently detecting and reacting to such unauthorized accesses, while maintaining convenient access to authorized users.

Further, designers have attempted to provide certain restrictions on the operation or usage of wireless devices in certain contexts. However, the related art fails to perform such function in an efficient and/or non-intrusive manner. For example, designers have attempted to restrict usage of wireless devices in certain contexts, such as in an aircraft or in a vehicle. For example, U.S. Pat. No. 7,181,229 discloses a cell phone regulation system which shuts off cell phones when the user is in a vehicle that is traveling above a certain speed. Further, U.S. Pat. No. 5,995,833 discloses a system where an aircraft telecommunications system prevents a passenger's cellular phone from accessing the aircraft's air-to-ground wireless network during certain flight routines. In other examples, U.S. Pat. Nos. 6,393,301 and 7,236,776, disclose in-car systems which place a cellular phone in a suspended mode when the car's speed is above a certain value. However, these disclosures are limited to cell phone restrictions based upon an external device that communicates with the cell phone in order to place the cell phone in a restricted mode, e.g. an aircraft telecommunications system that prevents a passenger's cell phone from accessing the aircraft's air-to-ground wireless network.

Further, some in-car systems refer to a separate device in the car that communicates with a cell phone in order the disable the phone. In each of these cases, the determination with regard to speed and operation of the aircraft or the vehicle is determined by an external device that is immediately proximate to the cellular phone, wherein the external device provides this communication to the cell phone in order to restrict the use of the cell phone. The systems described above generally perform many of these functions in an intrusive and inefficient manner, using an external device that is proximate to the cell phone. Further, these systems require an external device to be in place within the aircraft or the vehicle. This requires additional costs for hardware and installation of the systems. Still further, these systems are only operational when the external controllers properly communicate with the wireless device, which may require excessive synchronization, excessive circuitry, and excessive coordination with various technology standards, which may or may not exist. Many systems generally lacks an intelligent system within a wireless device that is capable of assessing certain conditions in order to determine and implement an appropriate operating mode of the wireless device.

SUMMARY OF THE INVENTION

In one aspect of the present invention, a method for automatically changing the operating mode of a wireless device is provided. A determination is made whether at least one state of the wireless device has changed. This determination is performed using at least one integrated device of the wireless device. A determination is made whether the change in the state of the wireless device indicates that the first operating mode should be changed. The operating mode is changed to a second operating mode of the wireless device in response to a determination that the change in the state of the wireless device indicates that the first operating mode should be changed. Changing to the second operating mode includes altering at least one wireless communication operation of the wireless device.

In another aspect of the present invention, a wireless device capable of having a plurality of operating modes is provided. The wireless device includes an integrated device capable of determining an environmental factor, a physical factor, and/or a user-access factor relating to the wireless device. The wireless device also includes a processor operatively coupled to the integrated device. The processor is adapted to determine whether a change of at least one state of the wireless device has occurred based upon at least one of the environmental factor, the physical factor, or the user-access factor. The processor is also adapted to change a first operating mode of the plurality of operating modes of the wireless device, to a second operating mode of the plurality of operating modes of the wireless device in response to the change of the state of the wireless device. The first and second operating modes relate to at least one communication function of the wireless device.

In yet another aspect of the present invention, a computer readable program storage device encoded with instructions is provided for automatically changing the operating mode of a wireless device. The computer readable program storage device encoded with instructions that, when executed by a computer, performs a method, which comprises: determining at least one of a physical factor, an environmental factor, or an access-related factor experienced by the wireless device using at least one integrated device of the wireless device; determining whether a condition of the wireless device based upon the at least one of the physical factor, the environmental factor, or the access-related factor experienced by the wireless device; determining whether the change in the condition of the wireless device compared to a previous condition of the wireless device, is over a predetermined threshold; and changing to a second operating mode of the wireless device from the first operating mode in response to a determination that the change in the condition of the wireless device is above the predetermined threshold. The first operating mode comprises a first wireless communication feature and the second operating mode comprises a second wireless communication feature.

In yet another aspect of the present invention, a system is provided for providing cellular communications and automatically changing the operating mode of a wireless device. The system of the present invention includes a cell that includes an antenna that is operatively coupled with an antenna control unit. The antenna control unit is adapted to control communications within the cell. The antenna control unit is also adapted to affect at least one electrical characteristic of the antenna. The system also includes a base station that is communicatively coupled to the cell. The base station is adapted to manage communications relating to the cell by controlling the performance of the antenna control unit the cell associated with the cellular communications system. The system also includes a wireless device that is communicatively coupled to the cell. The wireless device includes: an integrated device capable of determining an environmental factor, a physical factor, and/or a user-access factor relating to the wireless device. The wireless device also includes a processor operatively coupled to the integrated device. The processor is adapted to determine whether a change of the state of the wireless device has occurred based upon the environmental factor, the physical factor, and/or the user-access factor. The processor is also adapted to change a first operating mode of the plurality of operating modes of the wireless device, to a second operating mode of the plurality of operating modes of the wireless device in response to the change of the state of the wireless device.

In another aspect of the present invention, a communications device capable of changing its operation mode to an airplane mode is provided. The communications device includes a sensing device capable of detecting one or more signals indicative of the communications device being within an aircraft that is under operation. The communications device also includes a processor that is operatively coupled to the sensing device. The processor is adapted to determine whether the airplane mode should be implemented in response to the detection of the one or more signals indicative of the communications device being within an aircraft that is under operation. The processor is also adapted to implement the airplane mode based upon the determination that the airplane mode should be implemented. Implementing the airplane mode includes disabling at least one communication feature of the communications device.

BRIEF DESCRIPTION OF THE DRAWINGS

The invention may be understood by reference to the following description taken in conjunction with the accompanying drawings, in which like reference numerals identify like elements, and in which.

Figure 1:
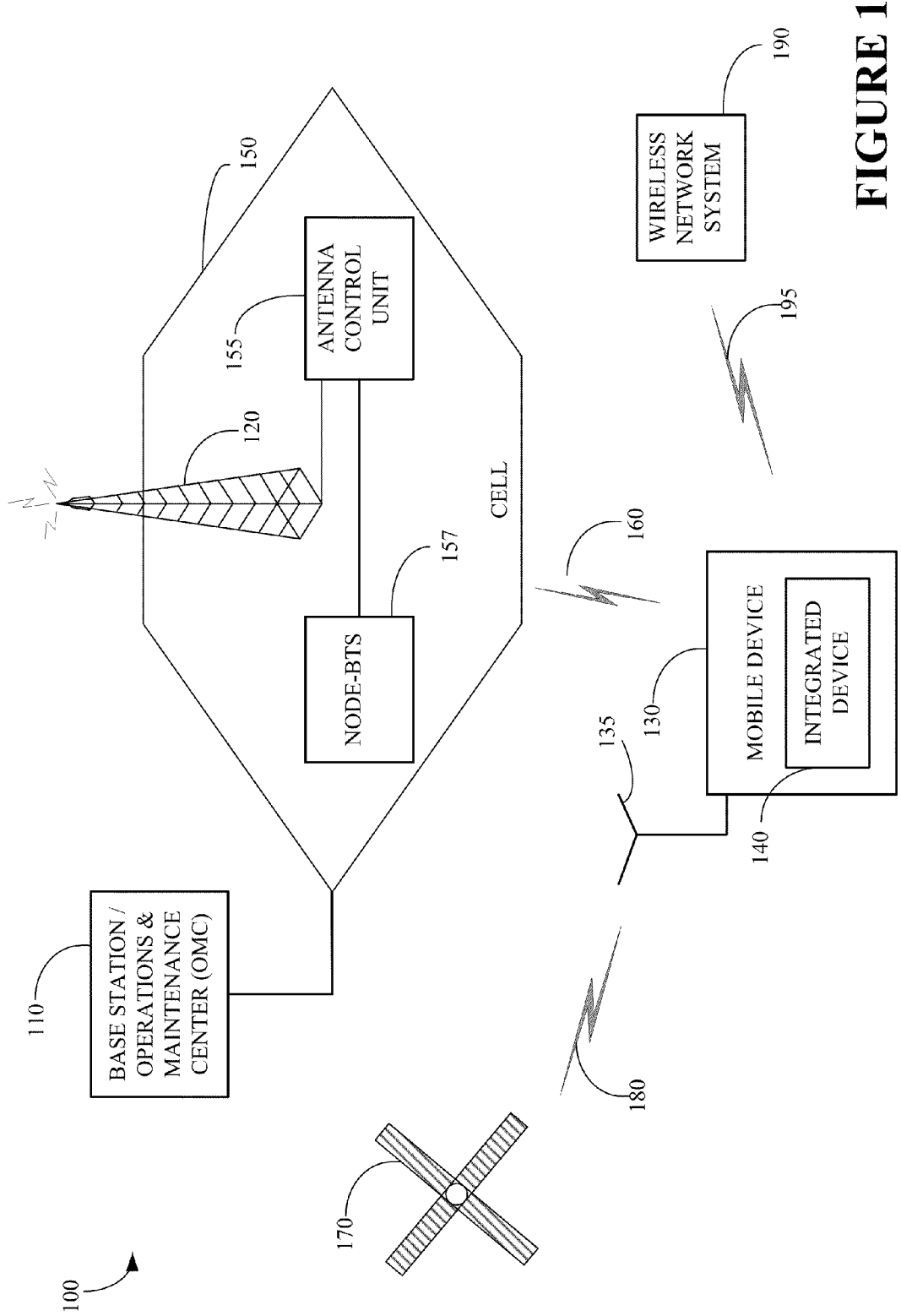
FIG. 1 illustrates a stylized depiction of a system that includes a mobile device system, in accordance with one illustrative embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One or more embodiments disclosed herein provide for modifying an operating mode of a wireless device, such as, a cellular phone or a Smartphone (e.g., the iPhone™ from Apple Inc.), a portable computer (e.g., the Macbook Air™ from Apple Inc.), a touchpad or tablet computer (e.g., the iPad™ from Apple Inc.), a personal digital assistant (PDA), etc., based on one or more factors, such as a state of the wireless device. In one embodiment, the state of the wireless device may refer to a condition experienced by the device, such as kinetic factors, e.g., as velocity, environmental factors, user access factors, etc. In one embodiment, the operation of the wireless device may change based upon the speed experienced by the device. For example, if the speed experienced by the device is indicative of speed of an aircraft, the mode of operation of the wireless device may be automatically switched to an alternative mode of operation, such as an "airplane" or an "aircraft" mode. In one embodiment, the airplane mode may refer to the disabling of one or more features of the mobile device, e.g., disabling all wireless communication features of the wireless device.

One example of the application of the airplane mode may include automatically determining whether the wireless device is in an aircraft that is in operation such that a restrictive mode is desired. The wireless device performs this determination using one or more apparatuses that are integrated within the device. For example, a GPS device within the wireless device may detect a vertical and/or horizontal displacement indicative of an operation of an airplane. This may lead to the determination that the wireless device is in an aircraft that is under operation.

Upon determining that implementation of an airplane mode is desired, the wireless device may disable at least one of its communication features. For example, to implement the airplane mode, the wireless device may disable its cellular communications features while preserving its gaming features. In one embodiment, the wireless device may perform a periodic check to determine whether the airplane mode should be maintained. The airplane mode of operation may be replaced with a normal operating mode when the wireless device determines that the airplane mode should be terminated. This determination may be made automatically based upon self-checks performed by the wireless device, or manually when a user provides an indication that normal mode should be resumed.

Embodiments of the present invention may also provide for additional alternative modes of operation. In one embodiment, one or more alternative modes of operation of the wireless device may be configurable by the user, or alternatively, may be configured via factory/manufacturing settings. For example, environmental factors, such as pressure experienced by the wireless device and/or temperature experienced by the wireless device may be used to alter the mode of operation. As an example, based upon a predetermined pressure experienced by the wireless device, the airplane mode may be activated. This process is described in further details below. Other alternative modes of operation may be prompted by other factors, such as the detection of an unauthorized user, or a category of user. Based upon a category of user, e.g., an underage user and/or an unauthorized user, certain functions available on the wireless device may be disabled or modified. For example, upon detection that an underage user is operating the wireless device, telephone communications may be disabled while preserving gaming features.

In some embodiments, the change in the mode of operation may be preceded by an alert to a user. In some embodiments, the change of operation mode(s) may automatically take place within a predetermined time subsequent to an alert provided to a user. In other embodiments, an option may be provided to the user to override the impending change in mode of operation. The changes in the mode of operation provided herein may be effectuated by an integrated device that is internal to the mobile device. In other words, in the embodiments disclosed herein, the wireless device may enter into an alternative mode of operation based upon devices that are internal to the wireless device and without requiring separate, specialized communication modules external to the wireless device. Certain standard external modules, such as wireless base stations, communication antennas, satellites and/or other devices that are associated with normal cellular communication systems, may still be required for communications.

In one embodiment, when an alternative mode is entered or deemed desirable, the wireless device may provide a warning and/or alert to the user. The warning/alert may delivered to the user in by using various types of messages with various contents. For example, when the wireless device determines that an airplane mode should be implemented; one or more alerts/warnings may be provided by the wireless device to the user. In an alternative embodiment, in addition to the warning/alert provided to the user, the wireless device may inform a third party or another external device of such warning. Other rules may also be implement, for example, if a user is given a warning that an airplane mode is desirable, and the user overrides an operation mode change, then a third party or device may be alerted that the user has refused to enter airplane mode.

Turning now to FIG. 1, one embodiment of a system in accordance with one illustrative embodiment is depicted. A communications system 100 may comprise a base station/operations & maintenance center 110 and a communication antenna/tower 120, which may communicate with a wireless device 130. In one embodiment, the system 100 may be a digital cellular network. The digital cellular network may comprise a plurality of cells 150 communicating over one or more antennas, such as an antenna 120, with a wireless device 130. The wireless device 130 may be a wireless device, such as a cell phone, that may be used whenever a network coverage is provided. However, the wireless device 130 may be any kind of device capable of communicating with the plurality of cells 150 in any one of numerous suitable forms of wireless communication for portable cellular and digital phones in addition to hand-held and hands-free phones and devices.

The wireless device 130 may include traffic data 160 from a subscriber activity in a service during an uplink. While the traffic data 160 may be a measurement of messages or voice calls transmitted in the digital cellular network over a period of time, an uplink may involve a signal transmission from the wireless device 130 to a cell, forming a reverse communication link.

The wireless device 130, using a wireless medium, may communicate via a mobile antenna 135 to the antenna 120 associated with the cell 150. The cell 150 may comprise an antenna control unit 155, which may adapt the antenna 120 characteristics, such as by changing an electrical down-tilt angle based on an electrical tilt adjustment. To this end, the cell 150 may include a node base transceiver station (NODE-BTS) 157 coupled to the antenna 120 via the antenna control unit 155. The node base transceiver station 330 may communicate with a base station/operations and maintenance center (OMC) 110 using a wireless/modem interface.

The base station/operations and maintenance center 110 may manage the digital cellular network by optimizing the performance of the cell 150 using the antenna control unit 155, which may be mounted within the antenna 120. In one embodiment, a new antenna alignment value for an electrical tilt adjustment may be sent from the OMC 110 to the relevant NODE-BTS 157 by an operations and maintenance (OAM) message.

Further, the wireless device 130 may communication with one or more satellite(s) 170 via a satellite communication link 180. Communications between the wireless device 130 and the satellite 170 may be performed in coordination with the OMC 110 and various components of the cell 150. The communications via the satellite communication line 180 may include various types of communications, such as one or more types of Global Positioning System (GPS) communications. Moreover, the wireless device 130 may be capable of communicating with one or more wireless network systems (e.g., Wi-Fi) 190 via a communication link 195. Those skilled in the art having benefit of the present disclosure would appreciate that the term "capable of" or "adapted to" may refer to structure and physical features in the context of an apparatus.

In one embodiment, the wireless device 130 may comprise an integrated device 140 (described in further detail below with respect to FIG. 6). The integrated device 140 may comprise one or more components that are capable of determining (or adapted to determine) a state of the mobile device. In one embodiment, without additional external prompts over and above normal communications from the base station 110 or the communication tower 120, the wireless device 130, via the integrated device 140, is capable of determining a state experienced by the wireless device 130. In accordance with one embodiment, based upon the state experienced by the wireless device 130, the device 130 may enter a modified operating mode. In one embodiment, the normal operating mode may be characterized by a normal or standard operation of various components of the wireless device 130, such as cellular telephone communications, email communications, other digital and/or analog communications, etc. Upon detection of a state change by the integrated device 140, the wireless device 130 may enter an alternative operating mode, such as deactivation of cellular telephone communications, digital communications, etc. The integrated device 140 may contain various sensors and/or other logic that is capable of notifying the wireless device 130 of an impending change of the operation mode.

Figure 2:
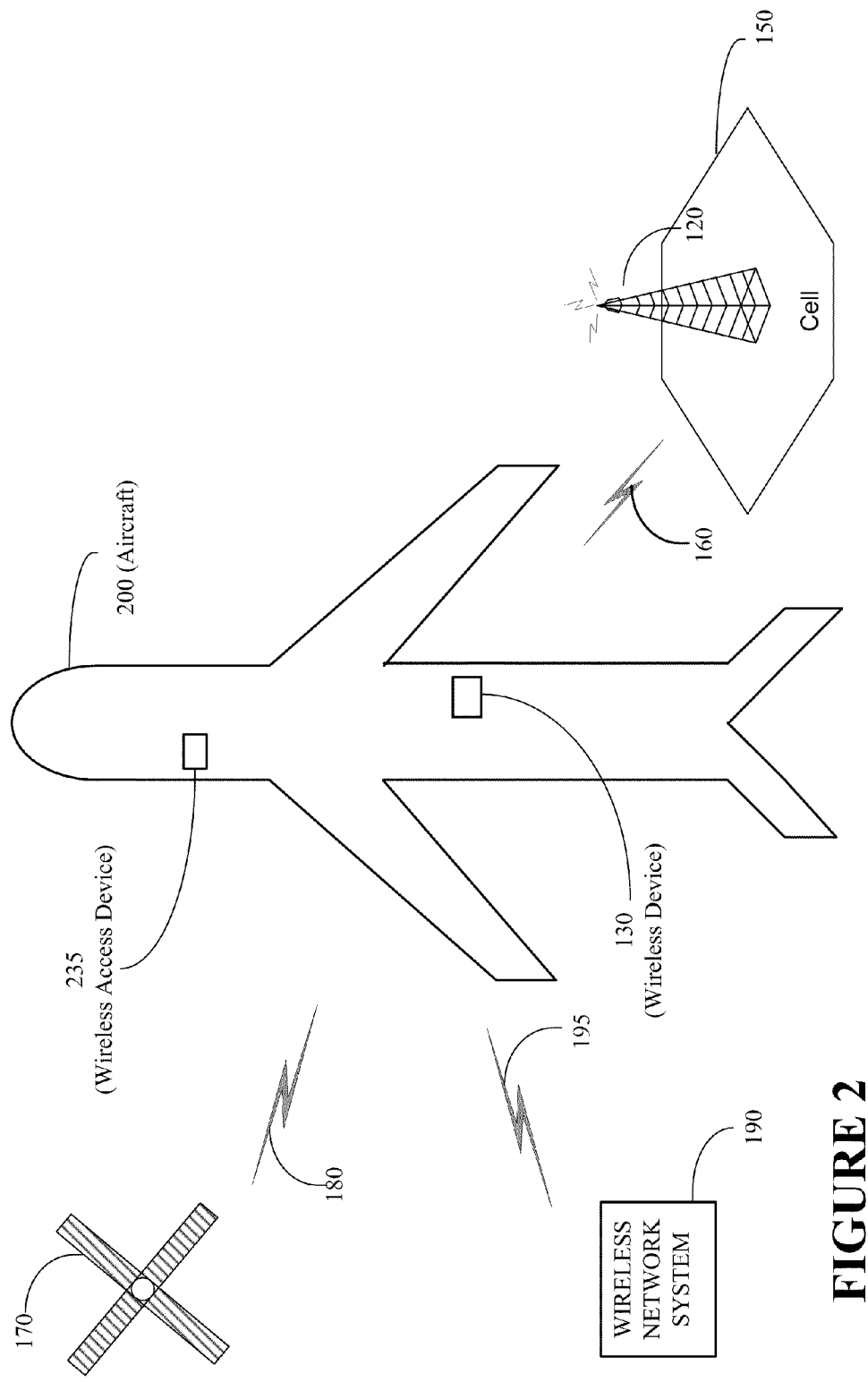
FIG. 2 illustrates a stylized depiction of an exemplary application of the mobile device of FIG. 1 in an airplane, in accordance with one illustrative embodiment.

FIGS. 2, 3, 4A and 4B each illustrate various different contexts in which the wireless device 130 may utilize the integrated device 140 to determine a change in state, in accordance with embodiments disclosed herein. In all four contexts (FIGS. 2-4B), the wireless device 130 is capable of communicating with at least one or more cells 150 and antenna 120 via the wireless link 160. Further, in all four contexts (FIGS. 2-4B), the wireless device 130 is capable of communicating with one or more satellites 170 via the communication link 180. Still further, in all three contexts (FIGS. 2-4B), the wireless device 130 is capable of communicating with one or more wireless network systems (e.g., Wi-Fi) 190 via the communication link 195. In the context of an airplane 200, as illustrated in FIG. 2 according to one embodiment, the wireless device 130 may detect, using integrated device 140, preparation for flight or take-off based upon a predetermined speed threshold being crossed, indicating that the state of the wireless device 130 has changed from a normal or standard operation state to a state in which airplane flight restrictions may exist. Other factors, such as pressure, aircraft-related communications, altitude, airport location, calendar entry indicating a schedule for a flight, and/or the like may be used separately or in conjunction with each other to determine whether the state has changed from a normal operation state to a state in which airplane flight restrictions may exist. During this state, an alternative mode, such as an "airplane mode," may be employed. The airplane mode may include a deactivation of cellular communication ability, WI-FI communication restrictions, etc., while maintaining other features, such as a non-communication gaming mode.

During this airplane mode, other functions of the mobile device, such as games, playback of music and/or video, etc., may be operational, in one or more embodiments. As discussed in further detail below, the airplane mode may be activated based upon a state change that indicates that the wireless device 130 is experiencing a greater than a predetermined threshold amount of at least one of acceleration, velocity, pressure, altitude, etc. For example, if an acceleration that is indicative of the take-off of an airplane is experienced by the wireless device 130, an airplane mode may be activated by the wireless device 130. Other examples include the sudden change in pressure that may be experienced due to the closing of the cabin doors of an airplane and the pressurizing of the passenger compartment, a change in the altitude indicative of a take off of an airplane, and the like, may be detected by an integrated device 140, which may prompt the wireless device 130 to enter an airplane mode.

Figure 3:
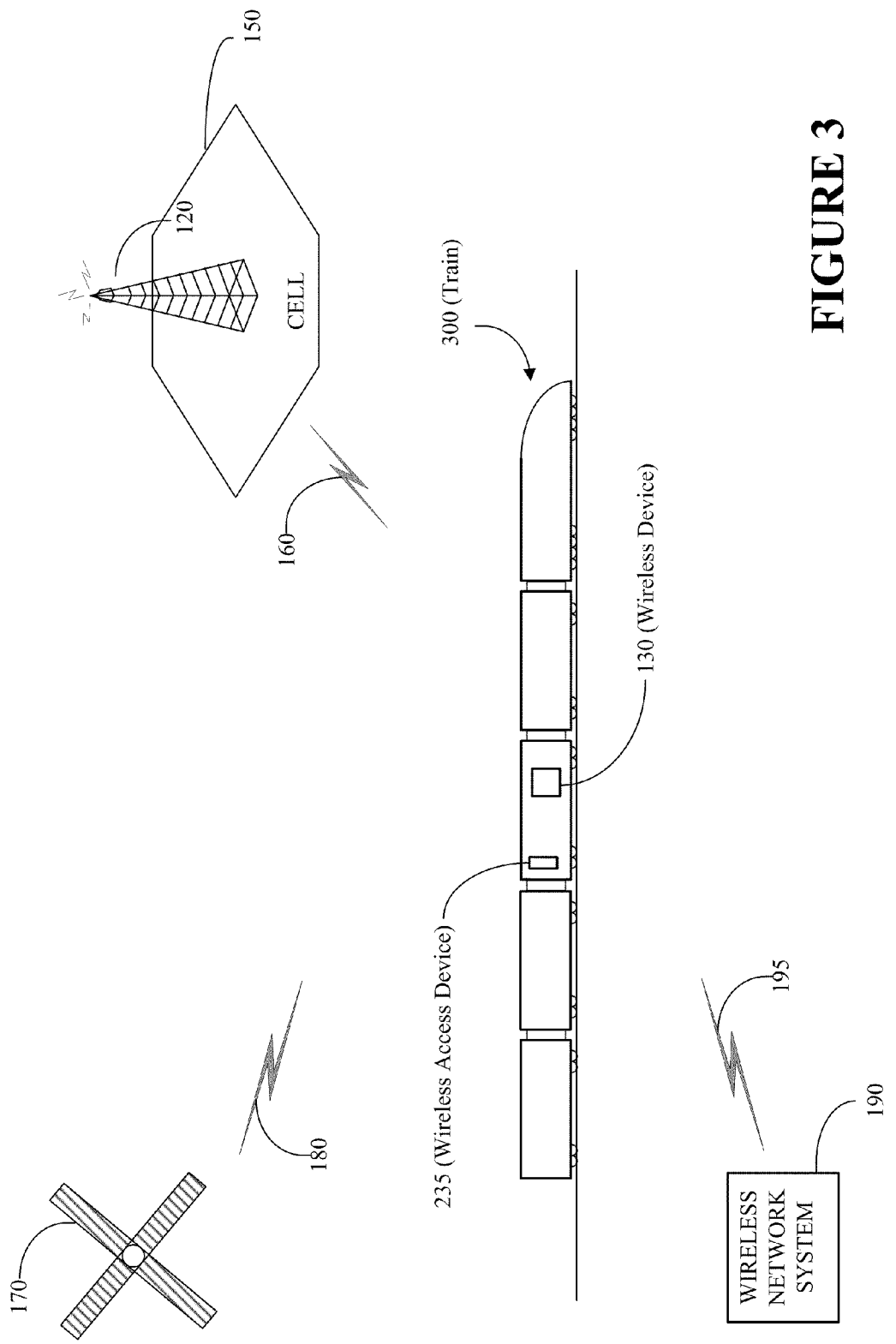
FIG. 3 illustrates a stylized depiction of an exemplary application of the mobile device of FIG. 1 in a train, in accordance with one illustrative embodiment.

Similar detection by the integrated device 140 may be made during the operation of a train 300 that is experienced by the wireless device 130 (see FIG. 3). Similarly, a wireless device 130 experiencing a change in state due to the operation of the vehicle 400 (see FIG. 4A) may also be used to enter into an alternative operational and/or communication mode. Further, a wireless device 130 experiencing a change in state due to the operation of the water vessel 475 (see FIG. 4B) may also be used to enter into an alternative operational and/or communication mode. The detection of the change in state may be performed by the internal device 140 residing within the wireless device 130, communicating via the communication link 160 and the cell 150, communicating via the communication link 180 and the satellite 170, and/or communicating via the communication link 195 and the wireless network system 190.

During the state change experienced by the wireless device 130 in the train 300, similar restrictions as to the airplane mode may be employed with slight modifications that define a "train mode." For example in the "train mode," cellular communication may be suspended, however, wireless communication within the train 300 may be allowed.

Figure 4A:
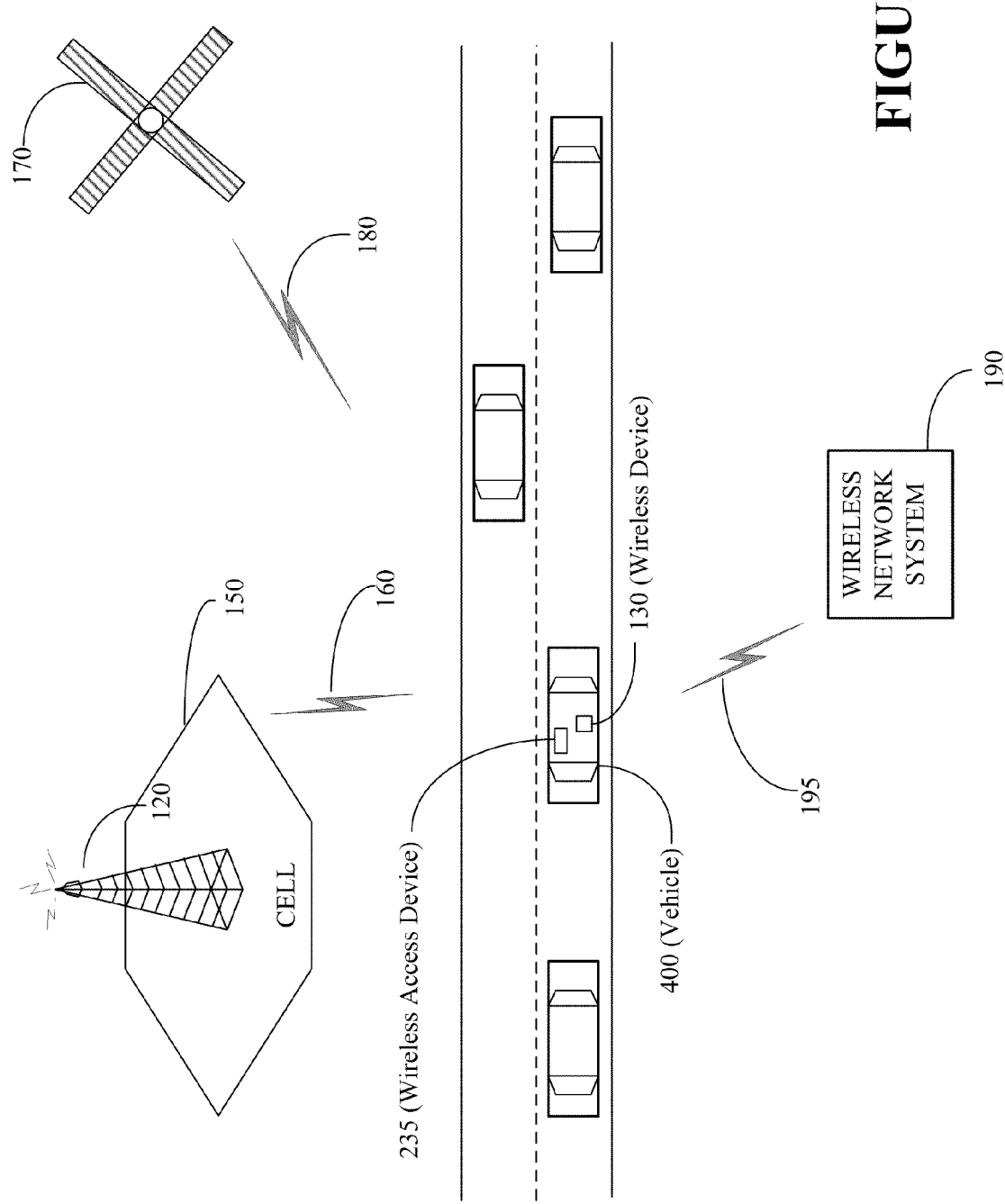
FIG. 4A illustrates a stylized depiction of an exemplary application of the mobile device of FIG. 1 in a vehicle, in accordance with one illustrative embodiment.

Referring to FIG. 4A, during the vehicle 400 operation, the change experienced by the wireless device 130, as during the operation of the vehicle 400, may prompt a "vehicle mode" operating mode. The vehicle mode may be characterized by allowing for wireless communications, however, the wireless communication being restricted to hands-free operation, such as headset communications (e.g., wired or wireless headset system, such as a Bluetooth® headset systems), or hands-free speaker communications.

Figure 4B:
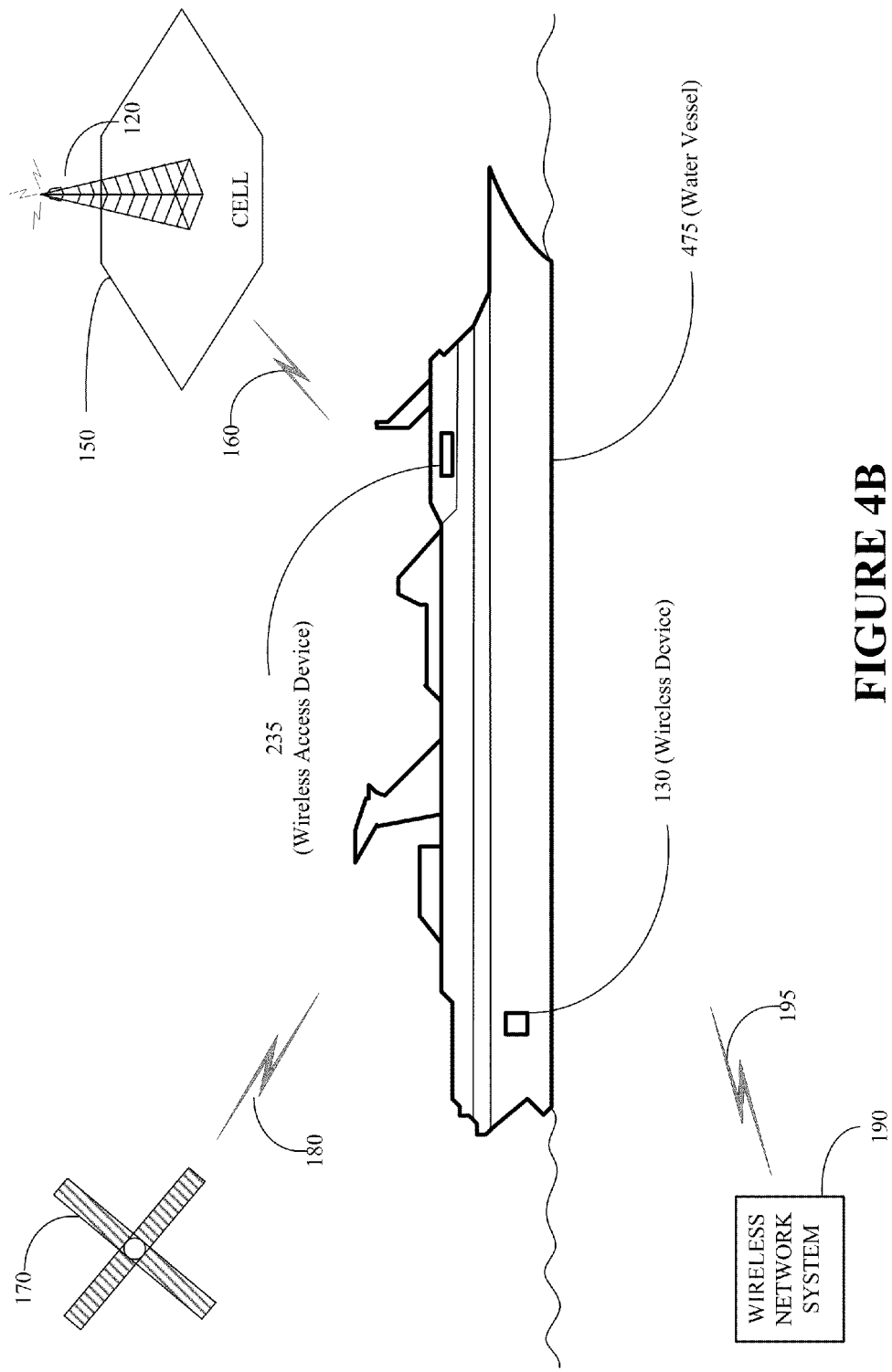
FIG. 4B illustrates a stylized depiction of an exemplary application of the mobile device of FIG. 1 in a water vessel, in accordance with one illustrative embodiment.

Referring to FIG. 4B, during the water vessel 475 operation, the change experienced by the wireless device 130, as during the operation of the water vessel 475, may prompt a "boat mode" operating mode. During the state change experienced by the wireless device 130 in the water vessel 475, similar restrictions as to the airplane mode may be employed with slight modifications that define the "boat mode." For example in the "boat mode," cellular communication may be suspended, however, wireless communication within the water vessel 475 may be allowed.

The types of restrictions for various operating modes may be preset by a user, or alternatively, preset during manufacturing (i.e., factory settings). In one embodiment, factory settings may comprise various predefined operating mode(s), such as airplane mode, train mode, vehicle mode, etc.; however, in one embodiment, these modes may be modified by a user. The subject matter disclosed in the present application may also be used by those skilled in the art, having the benefit of this disclosure, to apply to other operating modes based upon other state changes, such as change in a state of user type. For example, minor or underage users may be restricted as to the use of communications and email capabilities of the wireless device 130. In some embodiments, the use of emergency communications, such as dialing 9-1-1, may still be allowed to underage or unauthorized users. In alternative embodiments, other types of unauthorized users may also be restricted from using different communications capabilities of the wireless device 130. For example, if the integrated device 140 detects an unauthorized use or attempted use of the wireless device 130, the wireless device 130 may be switched to a mode that restricts the use of all communications and device applications. In such an operating mode, the wireless device 130 may be locked down and may require a password to be entered before changing to a different operating mode. Further, the wireless device 130, in one embodiment, may enter other alternative operating modes, such as power save modes, etc. Further detailed descriptions of the wireless device 130 are provided in additional drawings and respective accompanying descriptions below.

Those skilled in the art having benefit of the present disclosure would appreciate that the aircraft 200 illustrated in FIG. 2 may refer to various types of aircraft, such as a jet aircraft, a propeller aircraft, a helicopter, etc., and remain within the scope of the embodiments provided herein. Similarly, the train 300 (FIG. 3) may refer to any type of locomotive, passenger locomotive, cargo locomotive, etc. Further, the vehicle 400 (FIG. 4) may also refer to any type of a vehicle, such as a passenger car, station wagon, minivan, sports utility vehicle (SUV), pickup truck, commercial truck, tractor, and/or any type of vehicle. Similarly, water vessel 457 may refer to any type of water craft, such as a boat, passenger ship, cargo ship, barge, speedboat, etc.

Continuing referring to FIGS. 2-4B, in one embodiment, the aircraft 200, the train 300, the vehicle 400, and/or the water vessel 475 may each comprise a wireless access device 235. The wireless access device 235 may include a wireless access point (WAP), a local area network (LAN), a wireless local area network (WLAN), and/or the like. The wireless access device 235 may contain a media access control (MAC) address, a Ethernet hardware address (EHA), an Internet protocol (IP) address, a hardware address, an adapter address, a virtual address, and/or a physical address. One of more of these addresses may be used by the wireless device 130 to decipher its state or condition. For example, a wireless device 130 in an aircraft 200 may detect the WAP address or the IP address of the wireless access device 235 and using this address, a lookup in a database that may reside in the wireless device 130 may be performed. Based upon this lookup, the wireless device 130 may determine that its operating mode should be changed, for example to an airplane mode. Similar lookup of the one or more addresses associated with the wireless access device 235 in other settings illustrated in FIGS. 3-4B may be performed to change the operating of the wireless device 130 from a first operating mode to one of a train mode, a vehicle mode, or a boat mode.

In alternative embodiments, a wireless access device 235 (FIGS. 2-4B) may represent a device that provides a wireless signal that communicates to the wireless device 130 that it is now in one of an aircraft 200, a train 300, a vehicle 400, or in a water vessel 475. Based upon this signal, the wireless device 130 may change its operating mode from a first operating mode to one of an airplane mode, a train mode, a vehicle mode, or a boat mode.

Further, in one embodiment, the user of the wireless device 130 may enter of exit any one of the normal operating mode, the airplane mode, the train mode, the vehicle mode, or the boat mode in a manual fashion. For example, a code or any other signal received by the wireless device 130 may cause it to enter and/or exit out of a particular operating mode.

Figure 5:
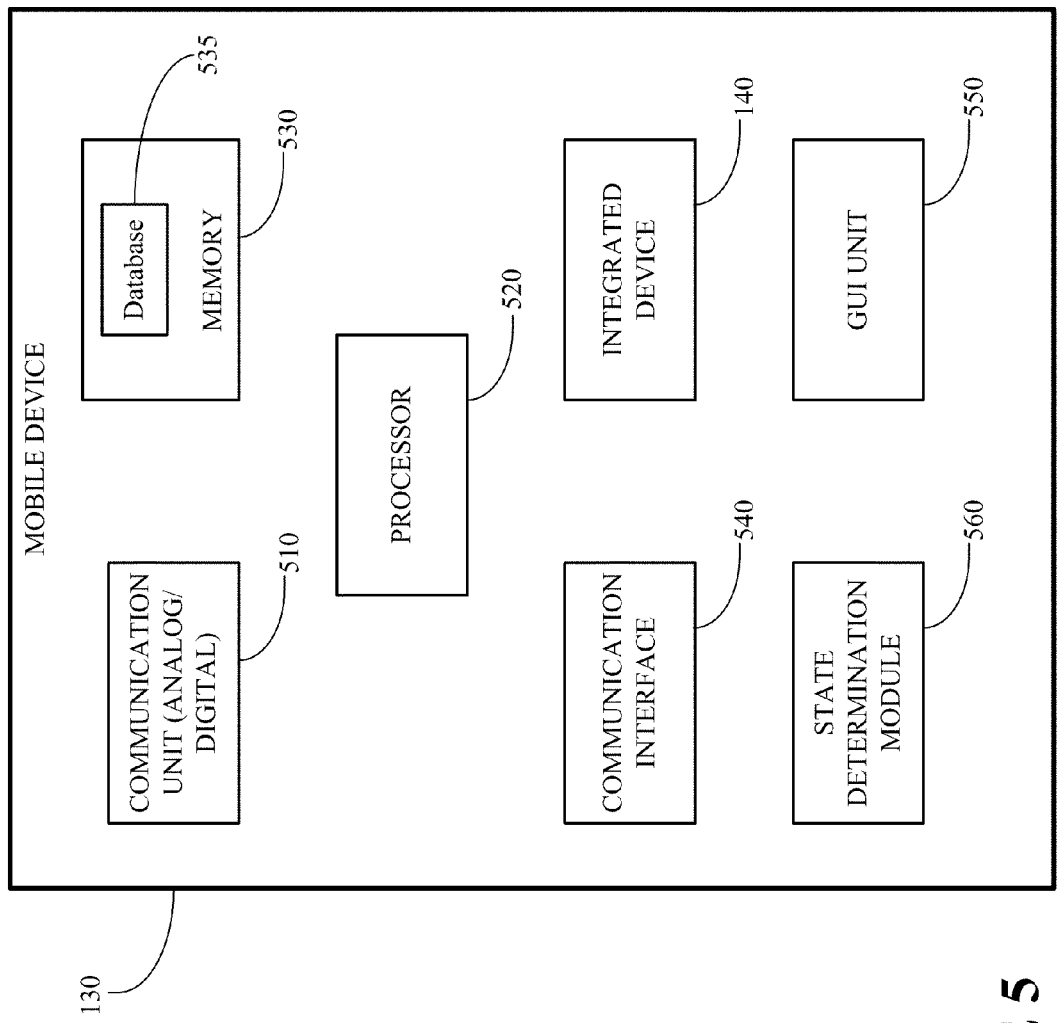
FIG. 5 illustrates a stylized block diagram of the mobile device of FIG. 1, in accordance with one illustrative embodiment.

Turning now to FIG. 5, a block diagram depiction of one embodiment of the wireless device 130 is depicted. In one embodiment, the wireless device 130 comprises a communication unit 510, a processor 520, a memory unit 530, a communication interface 540, the integrated device 140, a GUI graphical user interface unit 550, and a state determination module 560. One or more of the modules/units indicated as being part of the wireless device 130 may be a software module, a firmware module and/or a hardware module. In one embodiment, these modules/units may be implemented by a variety of software language, hardware circuitry, and/or hardware defined by hardware descriptive language (HDL) or equivalent. Those skilled in the art, having benefit of the present disclosure, may implement these modules/units in various software, hardware, and/or firmware form and remain within the scope of the embodiments disclosed herein.

In one embodiment, the communication unit 510 is capable of providing for analog and/or digital communications with devices external to the wireless device 130. The communication unit 510 may provide for telephone communications, cellular telephone communications, Wi-Fi™ communications, Wi-Max™ communications, and/or various other types of analog and/or digital communications. The processor 520 of the wireless device 130 is capable of performing various processing-type functions that may affect the operation of the wireless device 130. The processor 520 may represent a single processor, a plurality of processors (e.g., co-processors), digital signal processors (DSPs), microprocessors, and/or microcontrollers, memory components, etc., that work independently or in conjunction with each other. The memory components associated with the processor 520 may be a computer readable program storage device that may be encoded with instructions that, when executed by a computer or the processor 520, performs various methods associated with the embodiments described herein. The collective term processor 520, thus, may represent various types of processors, and/or controllers. Further, a programmable device, such as a field programmable gate array (FPGA) device, complex programmable logic device (CPLD), programmable logic array (PLA) and/or programmable array logic (PAL) may be implemented to perform various control functions that may be represented by the processor 520. In one embodiment, the processor 520 may be a computer as known to those skilled in the art having benefit of the present disclosure. In one embodiment, this computer may be a device that is capable of interfacing with a computer readable program storage device that may be encoded with instructions that, when executed by the computer, performs various methods associated with the embodiments described herein.

The memory 530 of the wireless device 130 may comprise various types of memory, such as D-RAMS, S-RAMS, other types of non-volatile memory, read-only memory, random access memory, solid state storage devices, hard disk drives, etc.; the various types of memory may be embedded memory, stand-alone memory or otherwise in accordance with different embodiments. Various types of memory capacities may be implemented by those skilled in the art, having benefit of the present disclosure, and remain within the spirit and scope of the embodiments disclosed herein. The memory 530 is capable of storing various data, such as contact information, control parameters, information relating to state look-up data, etc. As an example, the state look-up data may include various look-up information wherein the determination of the state of the mobile device may be made based upon various inputs and the look-up of the state information. The memory 530 may be a computer readable program storage device that may be encoded with instructions that, when executed by a computer or the processor 520, performs various methods associated with the embodiments described herein.

In one embodiment, the memory 530 may also include a database 535. The database 535 may comprise various information, such as MAC addresses and/or IP addresses of one or more wireless access devices 235 (FIGS. 2, 3, & 4). The database 535 may provide for look-up of these addresses and/or look up for other information, such as associating a particular address of the wireless access devices 235 to a particular state or condition of the wireless device 130, e.g., an indication that the wireless device is in an operating aircraft 200. Those skilled in the art having benefit of the present disclosure would understand that the database 535 may reside in alternative locations, such as outside the memory 530 (as a separate memory database unit), or within the integrated device 140.

The wireless device 130 may also comprise a communication interface 540. The communication interface 540 may provide for direct communications with various external devices via a digital communication infrastructure, such as universal serial bus (USB) interface communications, parallel data communications, serial data communications, infrared (IR) communications, wireless communications, wired communications, etc.

The wireless device 130 may also comprise a graphical user interface (GUI) unit 550. The GUI interface unit 550 is capable of providing information to a user on a display screen and receiving input from the user, e.g., using a touch or stylus input. Regarding the communication interface 540, keyboard input, mouse input information, track-ball input, pen input, etc., may be received via the communication interface 540.

In one embodiment, the wireless device 130 may also comprise a state determination module 560. The state determination module 560 is capable of determining various states experienced by the wireless device 130, such as a speed experienced by the wireless device 130. In one embodiment, the state determination module 560 is integrated into the processor 520. In another embodiment, the state determination module 560 is outside of the processor 520 and is operatively coupled to the processor 520. Further, description and illustration of the state determination module 560 is provided in FIG. 7 and the accompanying description below.

In one embodiment, the wireless device 130 may comprise one or more sensors 570. The term "sensors" may represent one or more sensors that are capable of performing data acquisition of various data. This data may include environmental data, such as pressure, temperature, altitude, movements, etc. The sensors 570 may be integrated into the wireless device 130.

The wireless device 130 may also comprise an integrated device 140, in accordance with one or more embodiments. The integrated device 140 may include portions that are capable of determining or sensing various environmental and/or physical factors experienced by the wireless device 130, such as the speed, acceleration, pressure, altitude, etc., experienced by the wireless device 130. The integrated device 140 is further described in FIG. 6 and the accompanying description below. The wireless device 130 is capable of utilizing the integrated device 140 and the state determination module 560 in order to acquire information and/or make one or more determinations as to a state experienced by the wireless device 130.

Figure 6:
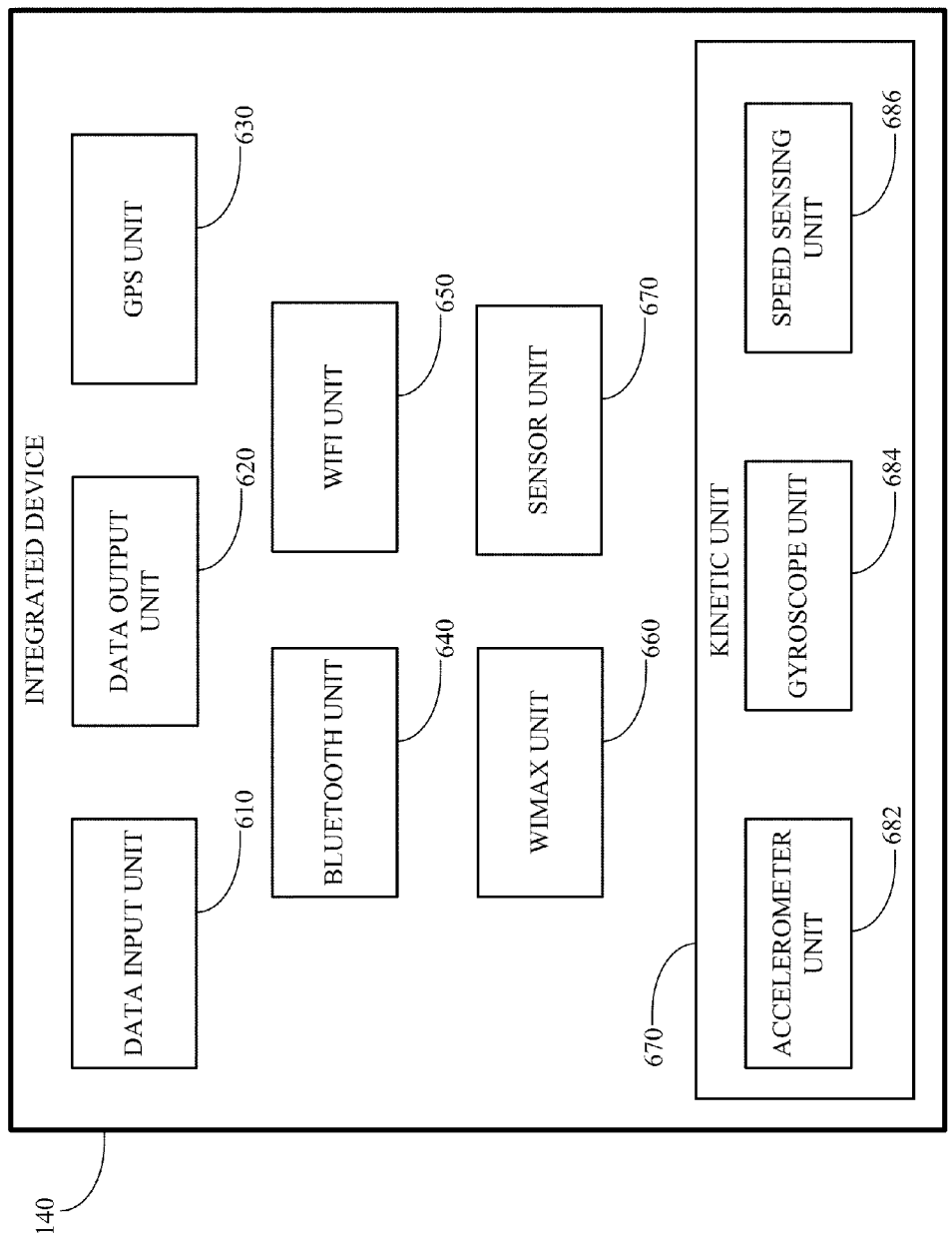
FIG. 6 illustrates a stylized block diagram depiction of an integrated device of FIG. 5, in accordance with one illustrative embodiment.

Turning now to FIG. 6, a stylized block diagram depiction of the integrated device 140, in accordance with one embodiment, is illustrated. The integrated device 140 may comprise various components that may be used to determine the state of the wireless device 130. The integrated device 140 may comprise a data input unit 610 and a data output unit 620. The data input unit 610 is capable of receiving data from a variety of components that may be associated with the wireless device 130, such as the sensors 570. The data received by the integrated device 140 may include indications from the processor 520 to perform various processing of environmental/state related data sets. The data input unit 610 may receive commands to provide state data, or data relating to state calculations, to the state determination module 560 (of FIG. 5).

Continuing referring to FIG. 6, the integrated device 140 may also comprise a data output unit 620. The data output unit 620 is capable of sending data from the integrated device 140 to various portions of the wireless device 130, such as the state determination module 560. The integrated device 140 may comprise a GPS unit 630, a Bluetooth unit 640, a Wi-Fi unit 650, a Wi-Max unit 660, a sensor unit 670, a kinetic unit 680, and the like.

The GPS unit 630 may comprise one or more circuits/devices, firmware, and/or software units that are capable of acquiring satellite data. In one embodiment, one or more portions associated with acquiring satellite data, such as an antenna, may be external to the integrated device 140 but operatively coupled to the internal integrated device 140 and residing substantially as a part of the wireless device 130. The GPS unit 630 is capable of receiving and processing global positioning satellite data and determining the relative position of the wireless device 130. Further, the GPS unit 630 is capable of detecting the change or displacement of the wireless device 130, the velocity of the wireless device 130, and/or the acceleration experienced by the wireless device 130. The GPS unit 630 is also capable of being compatible with one or more industry specifications, such as the $4^{th}$ Edition GPS specification for Naystar (2008), which may be found at http://pnt.gov/public/docs/2008/spsps2008.pdf.

The Bluetooth unit 640 is capable of acquiring and processing various Bluetooth-type data. The Bluetooth unit 640 is capable of being compatible with one or more industry specifications, such as the Bluetooth Specification, Version 4.0 (December 2009), which may be found at various sources, such as the exemplary website address http://www.bluetooth-.com/English/Technology/Building/Pages/Specifcation-.aspx. The Bluetooth unit 640 is capable of receiving various signals via the Bluetooth interface which may be integrated within the Bluetooth unit 640 or, alternatively, may reside external to the Bluetooth unit 640 but substantially resident in a wireless device 130. The Bluetooth unit 640 is capable of receiving data indicative of the state of the mobile device, such as position, movement, acceleration, velocity, association with a particular network, location, communications, etc.

The Wi-Fi unit 650 may comprise one or more circuits/devices capable of providing for Wi-Fi communications between the wireless device 130 and other external devices. The Wi-Fi unit 650 is, in one embodiment, compatible with a Wi-Fi specification such as the 2007 IEEE 802.11 Specification (or specific IEEE 802.11x specification), which may be found at http://standards.ieee.org/getieee802/download/802.11-2007.pdf. The Wi-Max unit 660 may comprise one or more circuits/devices capable of providing for Wi-Max communications between the wireless device 130 and external devices. The Wi-Fi unit 650 and the Wi-Max unit 660 are capable of acquiring data indicative of the location within the network, network information and/or communications, position, velocity, and/or acceleration experienced by the wireless device 130.

Moreover, the integrated device 140 may also comprise one or more sensors associated with the sensor unit 670, in accordance with one embodiment. The sensor unit 670 may represent one or a plurality of sensors that may operate in conjunction with each other or may act independently. The sensor unit 670 may include various sensors that provide GPS data, Bluetooth data, Wi-Fi data Wi-Max data, temperature data, pressure data, audio/noise level data, light detection video and/or picture detection, etc. The sensor unit 670 may provide data indicative of the location of the wireless device 130, the movement, displacement, acceleration, velocity, inclination, vibration, various environmental factors, biometric data (e.g., fingerprint data, retina scanning data, facial recognition data, voice data, and/or the like.) etc., relating to the wireless device 130. The integrated device 140 is capable of processing data received from the sensor unit 670 and providing the processed data to other components of the wireless device 130 via the data output unit 620.

The kinetic unit 680 may comprise one or more components that are capable of detecting and processing data relating to kinetic activity relating to the wireless device 130. For example, the kinetic unit 680 may comprise an accelerometer unit 682, a gyroscope unit 684, and/or other movement sensing units 686. The accelerometer unit 682 is capable of receiving and detecting accelerations experienced by the wireless device 130. The gyroscope unit 684 is capable of detecting movements/gyrations of the wireless device 130 in a plurality of directions. The speed sensing unit 686 of the integrated device 140 may represent collectively one or more devices or sensors that are capable of detecting a displacement and/or velocity/speed experienced by the wireless device 130.

As exemplified above, the integrated device 140 is capable of detecting various types of data that may be utilized by the wireless device 130 to determine the state of the wireless device 130. The integrated device 140 is also capable of verifying the previously detected state of the wireless device 130, which may include location, displacement, acceleration, velocity, operation mode, operation context, etc., of the wireless device 130. The integrated device 140 is capable of determining when the previous state of the wireless device 130 has changed.

Figure 7:
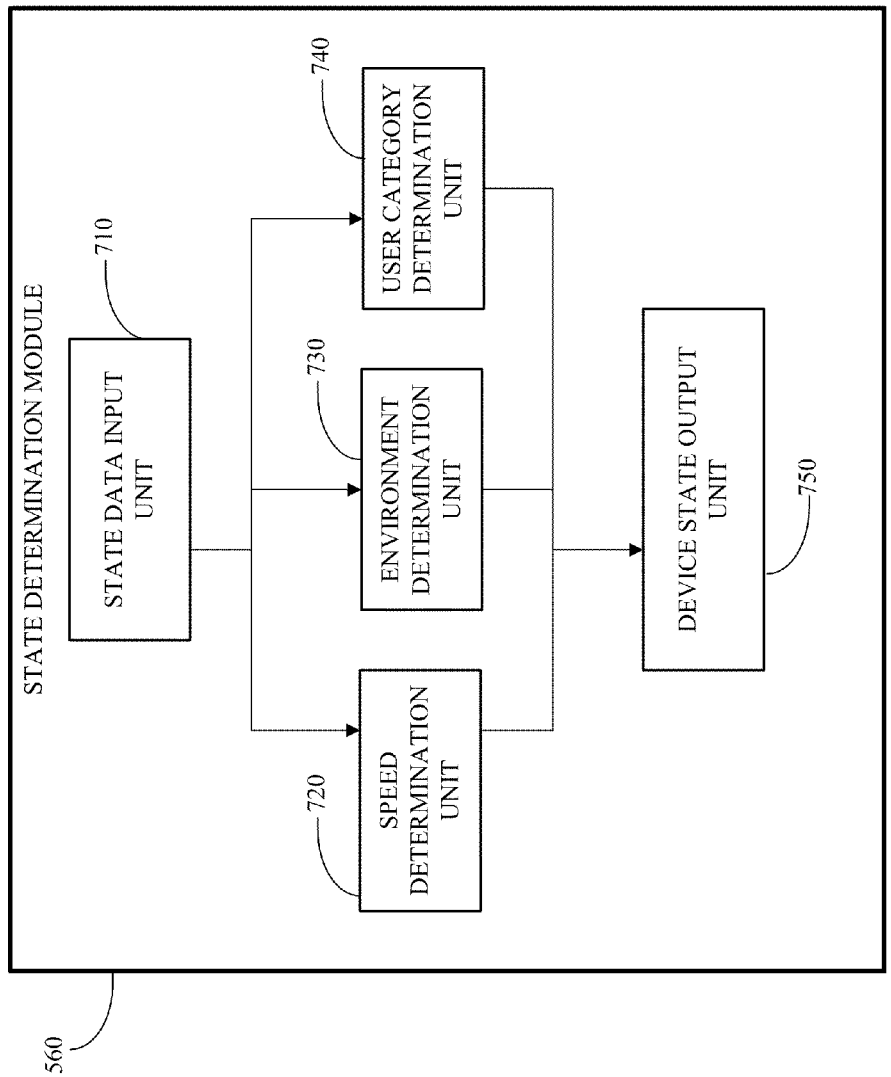
FIG. 7 illustrates a block diagram depiction of a state determination module of FIG. 5, in accordance with one illustrative embodiment.

Turning now to FIG. 7, a block diagram depiction of the state determination module 560 of FIG. 5, in accordance with one illustrative embodiment, is provided. The state determination module 560, as described above, is capable of determining one or more states associated with the wireless device 130. The state may refer to an environment or condition experienced by the wireless device 130. For example, the state of the wireless device 130 may include a pressure in environment, a temperature environment, or a light environment, a sound environment, a speed, an acceleration, a movement, an altitude, and/or the like, experienced by the wireless device 130. The state of the wireless device 130 may also refer to an access state, e.g., authorized user access state, unauthorized user access state, limited-access user state (e.g., underage user state), and/or the like.

In one embodiment, the state determination module 560 comprises a state data input unit 710. The state data input unit 710 is capable of receiving data relating to the state from the integrated device 140. This data may include various data that is provided by the data output unit 620 (FIG. 6) of the integrated device 140. The state determination module 560 may also comprises a speed determination unit 720, an environment determination unit 730, a user-category determination unit 740, and a device state output unit 750. The speed determination unit 720 may receive data from the state data input unit 710 and determine a speed state experienced by the wireless device 130. For example, based upon various data provided by the GPS unit 630 of the integrated device 140 (FIG. 6), the speed determination unit 720 is capable of calculating a speed experienced by the wireless device 130. Other data, such as network traffic data associated with a Wi-Fi system, for example, cellular communications status data, etc. may be used to determine the speed experienced by the wireless device 130.

The environment determination unit 730 is capable of determining one or more environmental factors experienced by the wireless device 130. For example, temperature pressure data, altitude data, etc., received by the environment determination unit 730 may be used to calculate various state of the wireless device 130. For example, based upon the pressure detected, a determination as to the altitude or depth experienced by the wireless device 130 may be made. Further, data input, such as the acceleration experienced by the wireless device 130, in combination with data relating to the pressure experienced by the wireless device 130, may lead to a determination that the mobile device 130 is likely in an airplane during or preceding flight operations, thereby prompting alternative mode of operation, such as an "airplane" mode.

The user-category determination unit 740 is capable of determining the user state of the wireless device 130. For example, the user state may indicate that an authorized user is now operating the wireless device 130. Alternatively, the user state may be indicative of an authorized user, albeit an authorized user from a different category, as compared to the original authorized user. In one embodiment, the user-category determination unit 710 may also determine that a user is not an authorized user. As an example, state determination module 560 may determine that an unauthorized user, or a different category of user, e.g., an underage user, is operating the wireless device 130. Based upon the user-category state, the wireless device 130 may enter an alternative mode of operation, such as a restricted communication mode that may only allow for certain operations, such as games. Those skilled in the art would recognize that additional types of state determinations may be made by the state determination module 560 and remain within the spirit and scope of the embodiments provided herein. Based upon determination of the state of the wireless device 130, the device state output unit 750 provides output data indicative of the state of the wireless device 130. This data may be utilized by the wireless device 130 to change from one mode of operation to another, or to select from a plurality of other modes of operations in response to particular states of the wireless device 130, or in response to a particular combination of states of the wireless device 130.

Figure 8:
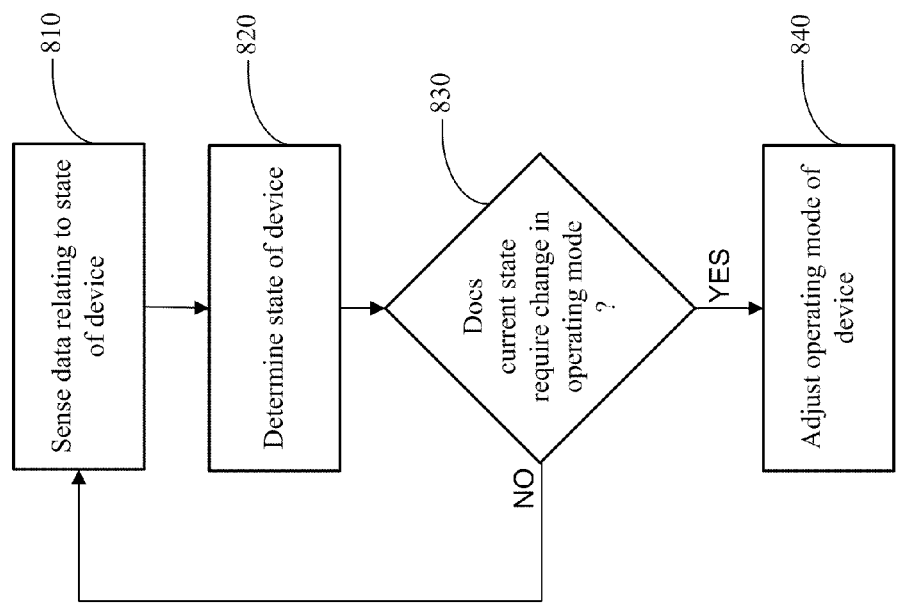
FIG. 8 illustrates a flowchart for performing an adjustment of an operating mode of the wireless device of FIG. 1, in accordance with one illustrative embodiment.

Turning now to FIG. 8, a flowchart depiction of the steps provided by the illustrative embodiments disclosed herein is provided. The wireless device 130 may sense data relating to its state 810 (block 810). Sensing the data may include receiving various types of data, such as GPS data, Bluetooth data, Wi-Fi data, Wi-Max data, etc. Other sensor data, such as temperature data, pressure data, noise data, light data, altitude data, humidity data, etc. may also be sensed by the wireless device. Based upon data relating to the state of the wireless device 130, a determination as to the state of the wireless device 130 may be made (block 820). As described above, the state determination module 560 (FIG. 5) may use the data relating to the state to make a determination as to various types of state associated with the wireless device 130, such as a speed state, an environment state, a user category state, and/or the like.

The determination of the state of the wireless device 130 may be based upon one or more of various types of processes, such as predetermined categories stored in memory 530, performing a look-up function from one or more look-up tables that may be stored in memory 530, performing various calculations or running various algorithms, calculations made based upon sensor data, e.g., a calculation of speed experienced by the wireless device 130.

Upon determining its state, the wireless device 130 may determine whether the current state requires a change in operation mode (block 830). If the mobile device 130 determines that no changes in operating mode are required based on the state detected, a continuous sensing of data relating to the states and an updating of the state determination process is performed (see connection from block 830 to block 810). When a determination is made that the current mode of operation should be changed based on the determination of the state of the wireless device 130, an adjustment to the operating mode of the wireless device 130 is performed (block 840). Adjusting the mode of operation of the wireless device 130 may include selecting one or more of a predetermined configurable mode of operation. For example, a first mode may relate to a normal operation of the wireless device 130, wherein substantially all features, such as cellular communications, gaming, and third-party applications, are all active. A second mode of operation may include an "airplane" mode, wherein communication to external devices is terminated for the duration of the airplane mode. Moreover, a third mode of operation may include a slightly altered mode, such as a "car" mode, wherein cellular communications are available but restricted to only Bluetooth wireless headphone usage, or speaker phone functions. The car mode, or any other operation mode of the wireless device 130, may be customized to comply with federal, regional or local regulations and/or laws.

Still further, an exemplary fourth mode of operation may include an "unauthorized user" mode, or a "child" mode, which may provide for activation of some features such as games and Wi-Fi capabilities, GPS capabilities, etc., and the disabling of cellular communications. Those skilled in the art would recognize that any number of alternative modes that provide for any number of combination of active and inactive features of the mobile phone 130 may be implemented and remain within the spirit and scope of the embodiments disclosed herein.

Still further, an exemplary fifth mode of operation may include a mode in which a user may customize which states of the wireless device 130 provide for activation/deactivation of various features of the wireless device 130.

A more detailed description of step for performing the determining of state of the wireless device 130 (block 820) is provided in FIG. 9 and accompanying description below. Similarly, a more detailed description of the step for performing an adjustment of the operating mode of the wireless device 130 (block 840) is provided in FIG. 10 and accompanying description below.

Figure 9:
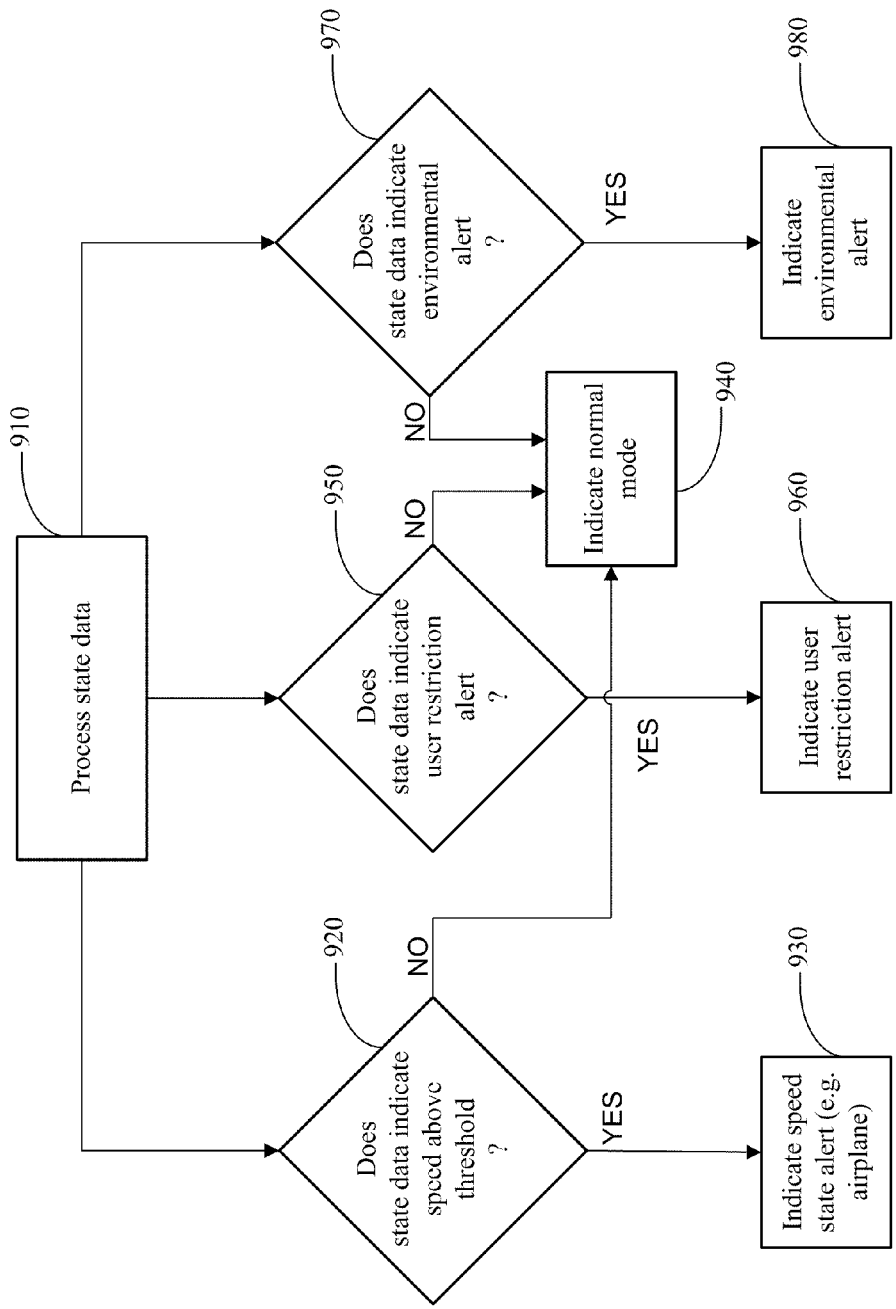
FIG. 9 illustrates a flowchart depiction of a step of determining the state of the wireless device, as provided in FIG. 8, in accordance with one illustrative embodiment.

Turning now to FIG. 9, a block diagram depiction of the steps for determining the state of the wireless device 130 (block 820 of FIG. 8), in accordance with the illustrative embodiment, is depicted. The state determination module 560 may process state data received from the integrated device 140 (block 910). The processing of state data may include performing various filtering functions, look-up functions, buffering functions, registering functions, multiplexing functions, etc. Those skilled in the art having benefit of the present disclosure would recognize that the wireless device 130 may comprise various hardware, software, firmware (e.g., digital signal processing firmware), etc., that are capable of performing the processing and filtering of the state data. The processed data may include speed data, user-category data, environmental data, and/or other data that may be indicative of the state of the wireless device 130.

The wireless device 130 may then make a determination of whether the speed data is indicative of a particular speed above a predetermined threshold (block 920). The term "predetermined" may refer to a period of time before the performance of the action, calculation, or determination associated with this term. The predetermined threshold may be used for various comparison functions to determine whether the predetermined threshold has been crossed. For example, a minimum speed sufficient to indicate movement of an airplane may be used to determine that the data indicates that the speed state of the wireless device 130 has crossed an aircraft movement threshold, thus the wireless device 130 may be deemed to require a change into an airplane mode.

Further, various restrictions such as the requirement that speed be detected for a minimum of 30 seconds, or for any other time frame, may be made. In one embodiment, if a large deviation from an expected threshold value is found, other test(s) for verification may be performed. Alternatively, or in conjunction, if a large deviation from an expected threshold value is found, the number of samples of the data being detected may be increased in predetermined step-increases. Therefore, the predetermined threshold may refer to at least one threshold relating to the state data, and alternatively, may include one or more additional thresholds, as well as a minimum time limit during which the threshold is required to be crossed.

Based upon a determination that the state data indicates a speed above a threshold, the wireless device 130 may provide an indication that a speed state has exceeded a threshold and an alert may be provided (block 930). This alert may be sent to various persons, such as the user, and/or to the operator of an airplane. Further, the state determination module 560 may also make a determination of whether the state data indicates that a user restriction alert is appropriate (block 950). Based upon the user restriction alert, an indication to the user regarding the user restriction alert may be provided at block 960. Alternatively, or in addition, a message (e.g., an email or a call to another device, such as landline telephone) may be sent/ made to a person (e.g., original user/owner of the wireless device 130), indicating that an unauthorized or a restricted user is accessing the wireless device 130. This indication may be an internal signal sent to the processor 520 (FIG. 5), and/or may be a message sent to the user.

When a determination is made that the state data is not above a speed threshold, the wireless device 130 indicates "normal" operating mode (see block 940). The normal operating mode may refer to a predetermined or default operating mode of the wireless device 130. One example of a normal mode may be a mode in which all functions of the wireless device 130 are active. When state data indicates that the user restriction alert is not appropriate, an indication that normal operation mode conditions are occurring may be provided. When the wireless device 130 determines that the user restriction alert is to be provided, an indication regarding the user restriction alert is provided. This alert may be sent to the user and/or to the processor to effectuate a change in the mode of operation.

The state determination module 560 may also determine that the state data is indicative of an environmental alert (block 970). If a determination is made that the state data is indicative of an environmental alert, an alert indicating as much may be provided to the user and/or to the processor 520 (block 980). Environmental alerts may include detected excessive heat, detected excessive pressure, detected excessive humidity, a detected altitude threshold crossing, etc. These indications may be used by the user and/or the wireless device 130 to effectuate a change in the mode of operation of the wireless device 130.

Figure 10:
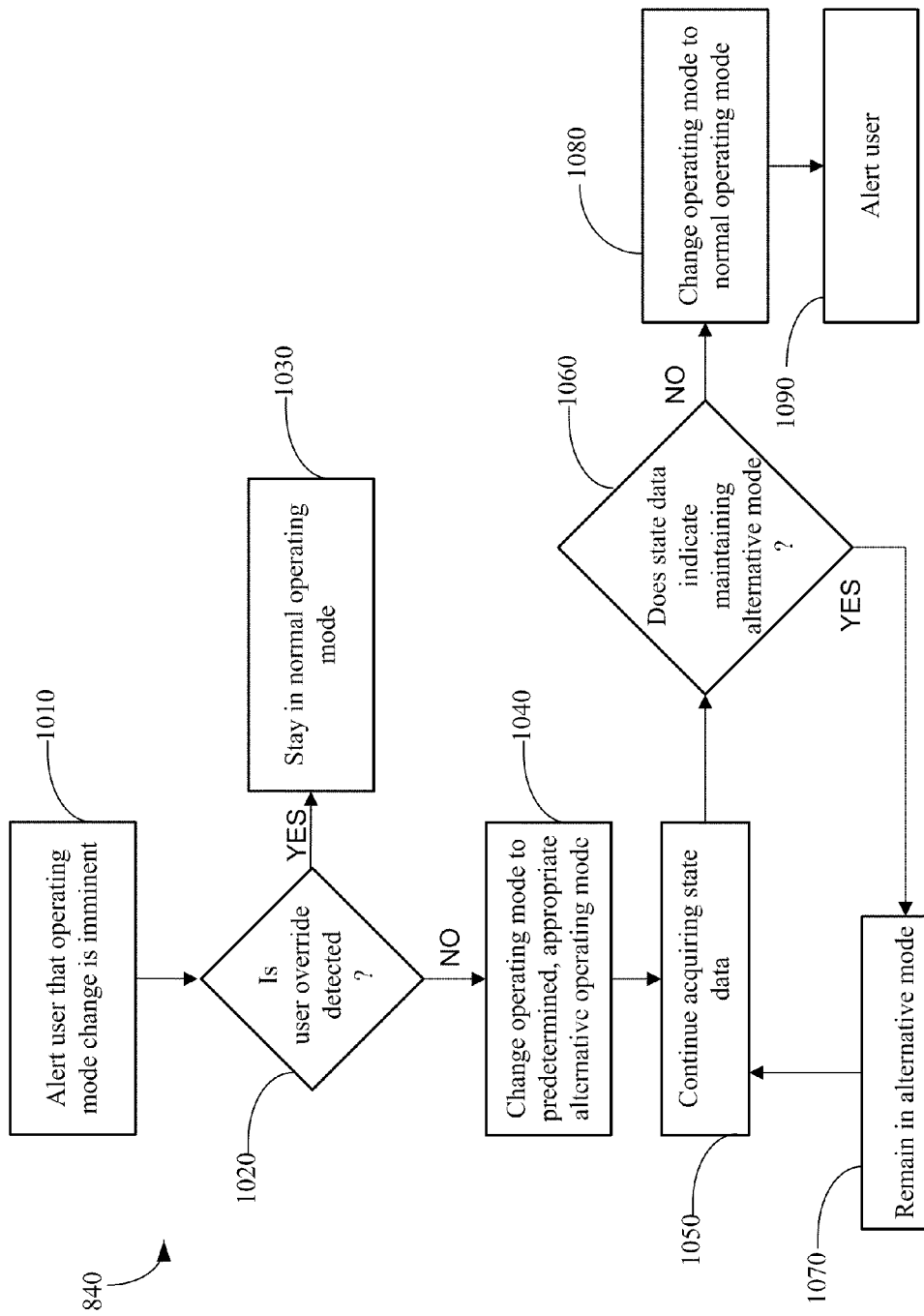
FIG. 10 illustrates a flowchart depiction of the step of adjusting an operation mode of the wireless device, as provided in FIG. 8, in accordance with one illustrative embodiment.

Turning now to FIG. 10, the flowchart depiction of the step of performing the adjustment of the operating mode of the wireless device 130 (block 840 of FIG. 8), in accordance with one illustrative embodiment provided herein, is provided. The wireless device 130 may alert the user that the operating mode change is imminent (block 1010). This alert may be made in one or more ways, such as audio, visual, and/or text indications. Other indications, such as a vibration, may also be used to provide the alert to the user. A determination of whether a user override of the alert is detected may be made by the wireless device 130 (block 1020). For example, a capability to override and preclude an operating mode change may be provided to the user. In this manner, the user may decide whether to allow the impending operating mode change.

If a user override is detected, the wireless device 130 may stay in a normal operating mode or the current operating mode (block 1030). In one embodiment, the override feature described above may be restricted to one or more particular type(s) of mode changes, such as airplane mode. In alternative embodiments, or for particular types of changes in operating mode, the user may not be provided with an option. The effect of this would be the same as if a user-override was not detected. In this case, the change in the operating mode may be made to move to a predetermined, appropriate alternative operating mode (block 1040). For example, based upon an altitude data received by the wireless device 130, in combination with speed detection, the wireless device 130 may enter into airplane mode if the user override is not detected.

The wireless device 130 may activate other predetermined operating modes, such as child mode, power save mode, etc., based upon the particular type of state detected. After changing to the alternative operating mode, the wireless device 130 may continue to acquire state data at block 1050. Upon continuing to acquire state data, the wireless device 130 may determine whether the state data indicates that the alternative state should be maintained (see block 1060). When the wireless device 130 determines, based on the state data, that the alternative operating mode should be maintained, it remains in the alternative mode (per block 1070). The wireless device 130 may continue to acquire state data and determine whether the state data indicates maintenance of the alternate mode (see connection from block 1070 to block 1050). For example, if the state data indicates that the altitude state and the speed state of the wireless device 130 continues to remain above certain respective thresholds, the airplane mode may be maintained. Conversely, if for example, the wireless device 130 determines that changes in altitude, pressure, speed, and/or location are indicative of an aircraft landing, then the airplane mode may be terminated and a normal operation mode may be resumed. Alternatively, the authority to re-enter a normal mode of operation may be provided to the user, via for example a code entry, a biometric detection, or another predetermined input from the user.

When the wireless device 130 determines that the maintenance of the alternative mode should be terminated, the wireless device 130 changes its operating mode from an alternative operating mode (e.g., a second operating mode) to the normal operating mode (e.g., a first operating mode) (block 1080). In one embodiment, the change from an alternative mode may lead to a normal operating mode; however, other operating mode transitions may be performed in alternative embodiments. For example, after a determination that a change from an alternative operating mode change is required, instead of going back to a normal operating mode, another secondary mode may be implemented; and subsequently, upon a determination that the secondary mode should be terminated, the normal operating mode may be reinstated or a tertiary operating mode may be implemented.

Upon any change from the alternate operating mode to the normal mode (or to any other secondary mode) an alert to the user may be provided (at block 1090). In one embodiment, these operating mode changes, as well as the state data that prompted such changes, may be logged for future analysis. Such logging may be accomplished by the wireless device 130 using memory 530, or the like. In this manner, the detection of one or more states experienced by the wireless device 130 may be made and one or more changes in the operating mode of the wireless device 130 may be performed. For example, upon a determination that the mobile device 103 may be in a airplane while the airplane is in operation based upon one or more state data (e.g., the cabin door closes, a change of pressure is detected, followed by a significant speed being detected), an airplane mode that complies with FCC rules and various airplane mode rules implemented by various airlines, may be effectuated.

Utilizing embodiments of the present disclosure, various operating modes may be implemented by the wireless device 130 in response to the detection of one or more states experienced by the wireless device 130. Although the embodiments disclosed herein have been described in the context of various types of wireless/mobile devices, those skilled in the art having benefit of the present disclosure would understand that the concepts provided herein may be utilized for other types of devices, such as other un-wired devices, stationary devices (such as desktop computers, mainframes, manufacturing tools, base stations of various types), as well as other user devices, and remain within the spirit and scope of the embodiments disclosed herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for changing a first operating mode of a wireless device, comprising:
  determining whether at least one state of the wireless device has changed, wherein the determining is performed using at least one integrated device of the wireless device, wherein the at least one state of the wireless device is based upon at least one of a physical factor or an environmental factor, wherein the physical factor is at least one of a speed, a velocity, an acceleration, a movement, or a vibration of the wireless device, and wherein the environmental factor is at least one of a pressure, a temperature, a luminous intensity, or a sound experienced by the wireless device;

determining whether the change in the at least one state of the wireless device indicates that the first operating mode should be changed; and changing to a second operating mode of the wireless device in response to a determination that the change in the at least one state of the wireless device indicates that the first operating mode should be changed, wherein changing to the second operating mode comprises altering at least one wireless communication operation of the wireless device, and wherein the second operating mode comprises all of the following operating modes:

a train mode, wherein the train mode comprises disabling a cellular communications feature of the wireless device and allowing non-cellular communications operation of the wireless device;

a vehicle mode, wherein the vehicle mode comprises restricting cellular communications not conducted through a hands-free operation;

a boat mode, wherein the boat mode comprises disabling a cellular communications feature of the wireless device and allowing non-cellular communications operation of the wireless device; and an environmental condition mode, wherein the environmental condition mode comprises restricting at least one feature of the wireless device to prevent damage to the wireless device from at least one environmental condition.

2. The method of claim 1, wherein the at least one state of the wireless device is further based upon an access-related factor experienced by the wireless device.

3. The method of claim 2, wherein the physical factor further comprises a displacement of the wireless device, and wherein the access-related factor is at least one of an authorized user access state, an unauthorized user access state, or a limited-access user state.

4. The method of claim 1, wherein determining whether the at least one state of the wireless device has changed further comprises:

sensing data relating to the at least one state of the wireless device using the integrated device;

processing the sensed data to provide processed sensed data, wherein processing the sensed data comprises at least one of filtering the sensed data, buffering the sensed data, registering the sensed data, storing the sensed data, or using the sensed data to perform a look-up function;

comparing the processed sensed data to a predetermined threshold value; and determining that the at least one state of the wireless device has changed based on at least the comparing of the processed sensed data to the predetermined threshold.

5. The method of claim 4, wherein comparing the processed sensed data to a predetermined threshold comprises at least one of:

comparing a speed determined from the processed sensed data to a predetermined threshold speed value;

comparing at least one environmental factor determined from the processed sensed data to a predetermined environmental threshold value; or comparing at least one biometric data of a user of the wireless device determined from the processed sensed data to at least one predetermined biometric data.

6. The method of claim 1, wherein determining whether the change in the at least one state of the wireless device indicates that the first operating mode should be changed comprises at least one of:

determining whether the wireless device is in a train, and in a condition requiring an altered operating mode for the wireless device;

determining whether the wireless device is in a vehicle, and in a condition requiring an altered operating mode for the wireless device;

determining whether the wireless device is in a water vessel, and in a condition requiring an altered operating mode for the wireless device;

determining whether an environmental condition experienced by the wireless device requires an altered operating mode for the wireless device; or determining whether at least one user access of the wireless device requires an altered operating mode for the wireless device.

7. The method of claim 1, further comprising allowing a user of the wireless device to override the changing of the first operating mode.

8. The method of claim 1, further comprising providing an alert, the alert capable of signaling an impending change of the first operating mode.

9. A wireless device capable of having a plurality of operating modes, the wireless device comprising:

an integrated device capable of determining at least one of an environmental factor, a physical factor, or a user-access factor relating to the wireless device, wherein the physical factor is at least one of a speed, a velocity, an acceleration, a movement, or a vibration of the wireless device, and wherein the environmental factor is at least one of a pressure, a temperature, a luminous intensity, or a sound experienced by the wireless device; and a processor operatively coupled to the integrated device, the processor adapted to determine whether a change of at least one state of the wireless device has occurred based upon at least one of the environmental factor, the physical factor, or the user-access factor, said processor also adapted to change a first operating mode of the plurality of operating modes of the wireless device, to a second operating mode of the plurality of operating modes of the wireless device in response to the change of the state of the wireless device, wherein the first and second operating modes relate to at least one communication function of the wireless device, and wherein the first operating mode is a standard operation mode of the wireless device and the second operating comprises all of the following operating modes:

a train mode, wherein the train mode comprises disabling a cellular communications feature of the wireless device and allowing non-cellular communications operation of the wireless device;

a vehicle mode, wherein the vehicle mode comprises restricting cellular communications to hands-free operation;

a boat mode, wherein the boat mode comprises disabling a cellular communications feature of the wireless device and allowing non-cellular communications operation of the wireless device; and an environmental condition mode, wherein the environmental condition mode comprises restricting at least one feature of the wireless device to reduce damage to the wireless device from at least one environmental condition.

10. The wireless device of claim 9, wherein the physical factor further comprises a displacement of the wireless device, and wherein the user-access factor is at least one of an authorized user access state, an unauthorized user access state, or a limited-access user state.

11. The wireless device of claim 9, wherein the wireless device further comprises:
   a communications device adapted to provide communications between the wireless device and an external antenna coupled to a base station associated with a cellular communication system;
   a mobile antenna coupled to the communications device, said mobile antenna to provide a wireless signal path;
   a memory operatively coupled adapted to the processor and to the integrated device, the memory comprising a database comprising at least one of a media access control (MAC) address, an Ethernet hardware address (EHA), an Internet protocol (IP) address, a hardware address, an adapter address, a virtual address, or a physical address associated with a wireless access device;
   a communication interface operatively coupled to said processor and to said integrated device, said communication interface to provide communications through at least one of a universal serial bus (USB) link, a parallel data link, a serial data link, an infrared (IR) link, or a wired communications link;
   a graphical user interface (GUI) adapted to provide an interactive interface between a user and the wireless device; and
   a state determination module adapted to determine at least one state of the wireless device.

12. The wireless device of claim 9, wherein the integrated device comprises:
   a data input unit capable of receiving data from at least one other portion of the wireless device;
   a data output unit capable of providing data to at least one other portion of the wireless device; and
   at least one of:
      a global positioning system (GPS) unit capable of receiving global positioning satellite data and determining the relative position of the wireless device;
      a Bluetooth unit capable of receiving and sending Bluetooth data, said Bluetooth unit being capable of determining the relative position of the wireless device;
      a Wi-Fi unit capable of receiving and sending wireless data, the Wi-Fi unit being capable of determining the relative position of the wireless device;
      a Wi-Max unit capable of receiving and sending wireless data, the Wi-Max unit being capable of determining the relative position of the wireless device; and
      a kinetic unit capable of detecting a movement of the wireless device, the kinetic unit comprising at least one of a accelerometer unit capable of detecting an acceleration experienced by the wireless device, a gyroscope unit capable of detecting a movement experienced by the wireless device, or a speed sensing unit capable of detecting a speed experienced by the wireless device.

13. The wireless device of claim 9, wherein the wireless device is at least one of a cellular phone, a Smartphone, a portable computer, a touchpad, a tablet computer, or a personal digital assistant (PDA).

14. A computer readable program storage device encoded with instructions that, when executed by a computer, performs a method for changing a first operating mode of a wireless device, comprising:
   determining at least one of a physical factor, an environmental factor, or an access-related factor experienced by the wireless device using at least one integrated device of the wireless device, wherein the physical factor is at least one of a speed, a velocity, an acceleration, a movement, or a vibration of the wireless device, and wherein the environmental factor is at least one of a pressure, a temperature, a luminous intensity, or a sound experienced by the wireless device;
   determining whether a condition of the wireless device based upon the at least one of the physical factor, the environmental factor, or the access-related factor experienced by the wireless device, has changed;
   determining whether the change in the condition of the wireless device compared to a previous condition of the wireless device, is over a predetermined threshold; and
   changing to a second operating mode of the wireless device from the first operating mode in response to a determination that the change in the condition of the wireless device is above the predetermined threshold wherein the first operating mode comprises a first wireless communication feature and the second operating mode comprises a second communication feature, and wherein the second operating mode comprises all of the following operating modes:
      a train mode, wherein the train mode comprises disabling a cellular communications feature of the wireless device and allowing non-cellular communications operation of the wireless device;
      a vehicle mode, wherein the vehicle mode comprises restricting cellular communications not conducted through a hands-free operation;
      a boat mode, wherein the boat mode comprises disabling a cellular communications feature of the wireless device and allowing non-cellular communications operation of the wireless device; and
      an environmental condition mode, wherein the environmental condition mode comprises restricting at least one feature of the wireless device to prevent damage to the wireless device from at least one environmental condition.

15. The computer readable program storage device encoded with instructions that, when executed by a computer, performs the method of claim 14, wherein the first wireless communication feature comprises an activated cellular communication capability and an activated Bluetooth communication capability, and wherein the second wireless communication feature comprises a deactivated cellular communication capability and an activated Bluetooth capability of the wireless device.

16. The computer readable program storage device encoded with instructions that, when executed by a computer, performs the method of claim 14, wherein the physical factor further comprises a displacement of the wireless device, and wherein the access-related factor is at least one of an authorized user access state, an unauthorized user access state, or a limited-access user state.

17. The computer readable program storage device encoded with instructions that, when executed by a computer, performs the method of claim 14, further comprising:
   detecting an address associated with a wireless access device, the address being at least one of a media access control (MAC) address, an Ethernet hardware address (EHA), an Internet protocol (IP) address, a hardware address, an adapter address, a virtual address, or a physical address using the integrated device;
   performing a lookup of the at least of the MAC address, EHA, IP address, hardware address, adapter address, virtual address, or the physical address from a database of the wireless device to determine whether the detected address associated with a wireless access device corresponds to at least one of an airplane mode, a train mode, a vehicle mode, or a water vessel mode; and changing the first operating mode to at least one of the airplane mode, the train mode, the vehicle mode, or the water vessel mode based upon the lookup.

18. The computer readable program storage device encoded with instructions that, when executed by a computer, performs the method of claim 14, further comprising:
    detecting a signal associated provided by a wireless access device; and
    changing the first operating mode to at least one of the airplane mode, the train mode, the vehicle mode, or the water vessel mode, based upon the signal.

19. The computer readable program storage device encoded with instructions that, when executed by a computer, performs the method of claim 14, further comprising one of:
    receiving a user input and determining to change from the first operating mode to the second operating mode; or
    receiving a user input and determining to change from the second operating mode to the first operating mode.

20. The computer readable program storage device encoded with instructions that, when executed by a computer, performs the method of claim 14, further comprising changing an operating mode from the second operating mode to at least one of a third operating mode or the first operating mode in response to a determination that the condition of the wireless device has subsequently changed.

21. A cellular communications system comprising:
    a cell comprising an antenna operatively coupled with an antenna control unit, the antenna control unit is adapted to control communications within the cell, the antenna control unit is also adapted to affect at least one electrical characteristic of the antenna;
    a base station communicatively coupled to the cell, the base station being adapted to manage communications relating to the cell by controlling a performance of the antenna control unit of the cell associated with the cellular communications system; and
    a wireless device communicatively coupled to the cell, the wireless device comprising:
        an integrated device capable of determining at least one of an environmental factor, a physical factor, or a user-access factor relating to the wireless device; and
        a processor operatively coupled to the integrated device, the processor adapted to determine whether a change of a state of the wireless device has occurred based upon at least one of the environmental factor, the physical factor, or the user-access factor, said processor also adapted to change a first operating mode of a plurality of operating modes of the wireless device, to a second operating mode of the plurality of operating modes of the wireless device in response to the change of the state of the wireless device, and wherein the first operating mode is a standard operation mode of the wireless device and the second operating comprises all of the following operating modes:
        a train mode, wherein the train mode comprises disabling a cellular communications feature of the wireless device and allowing non-cellular communications operation of the wireless device;
        a vehicle mode, wherein the vehicle mode comprises restricting cellular communications to hands-free operation;
        a boat mode, wherein the boat mode comprises disabling a cellular communications feature of the wireless device and allowing non-cellular communications operation of the wireless device; and
        an environmental condition mode, wherein the environmental condition mode comprises restricting at least one feature of the wireless device to reduce damage to the wireless device from at least one environmental condition.

22. The cellular communications system of claim 21, wherein the environmental factor is at least one of a pressure, a temperature, a light, or a sound experienced by the wireless device, wherein the physical factor is at least one of a speed, a velocity, an acceleration, a movement, a displacement, or a vibration of the wireless device, and wherein the user-access factor is at least one of an authorized user access state, an unauthorized user access state, or a limited-access user state.

* * * * *